Nov. 23, 1948.     B. R. CAMERON     2,454,305
DRAFTING COMPASS
Filed Aug. 14, 1945
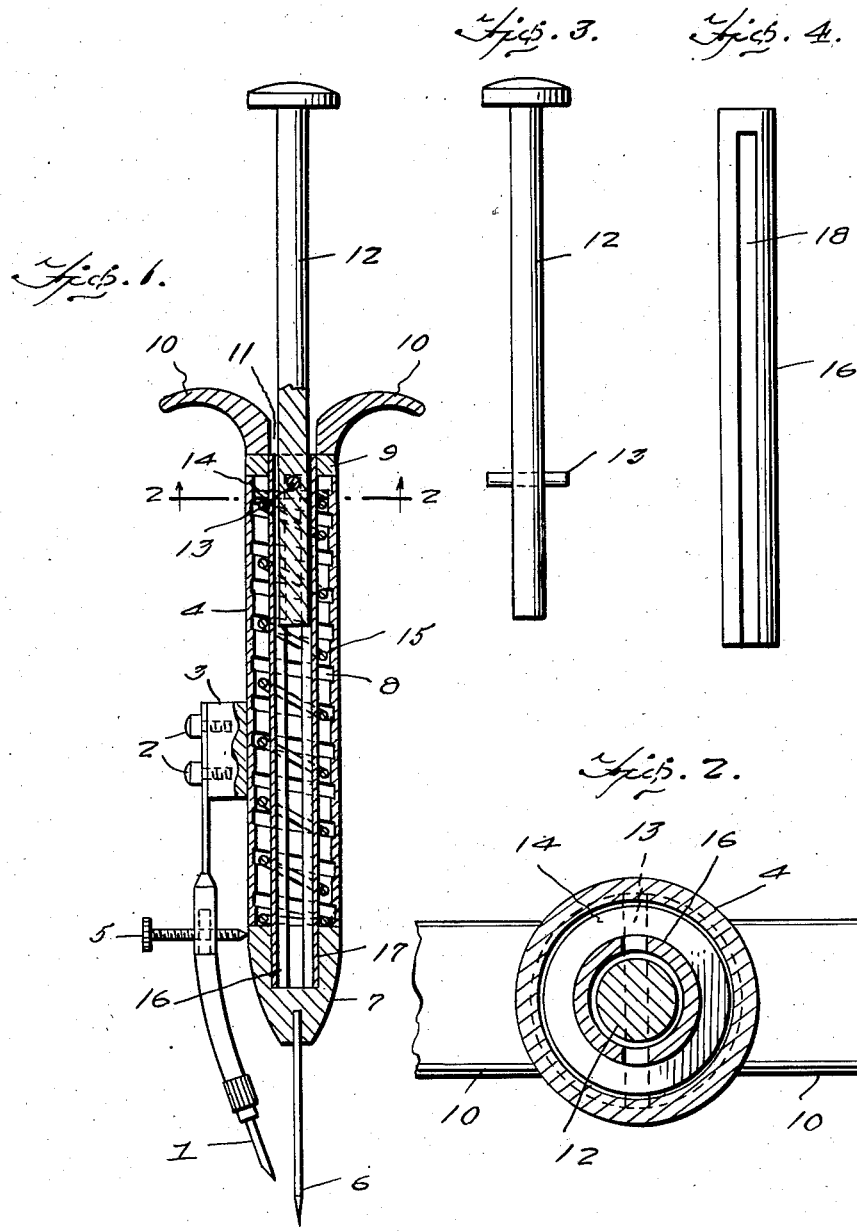
Inventor
Byron R. Cameron
By McMorrow, Berman & Davidson, Attorneys Patented Nov. 23, 1948

2,454,305

UNITED STATES PATENT OFFICE 2,454,305

DRAFTING COMPASS

Byron R. Cameron, Mount Vernon, Ill.

Application August 14, 1945, Serial No. 610,746

2 Claims. (Cl. 33—27)

The present invention relates to drafting compasses and is more particularly concerned with compasses constructed to rotate the compass point around a center spindle with power derived from the instrument itself.

It is well known to draftsmen who are frequently required to describe numerous circles with a drop compass for protracted periods that the work is tedious and especially fatiguing to the muscles of the thumb and index finger, usually employed to rotate the compass point.

The primary object of the invention is to provide a drop compass with integral parts located interiorly of the instrument and adapted to rotate the marking element or compass point after the compass is adjusted and centered.

Another object of the invention is to provide a compass of the aforesaid type, of simpler and more compact construction than that of prior devices.

With the foregoing and other objects and advantages in view, the invention consists of the novel construction and arrangement of parts hereinafter described and claimed.

In the accompanying drawings illustrating the invention,

Figure 1 is a longitudinal vertical section of the compass.

Figure 2 is a horizontal transverse section on line 2—2 of Figure 1.

Figure 3 is a side elevation of the plunger.

Figure 4 is a side elevation of the slotted guide for the pin in the plunger.

Like numerals in the description and drawings designate the same parts of construction.

1 designates the compass point but an ink pen or a lead holder may be attached instead. The compass point is attached, by means of set screws 2, to a lug 3 projecting from the outer wall of an elongated, tubular sleeve 4 at a suitable point thereon. A thumb screw 5 is provided to adjust the compass point 1 in relation to the center 6 so as to describe circles of various radii. The center is removably mounted in the end of a tapered, round collar 7. The sleeve 4 is provided with interior threads 8 of suitable pitch and angle adapted to engage the pin 13 of the hereinafter described plunger 12 contained within said sleeve. This sleeve 4 is interposed between said collar 7 and an upper collar 9 provided with finger grips 10 for the index and ring fingers of the hand. Centered in an aperture 11 in said collar 9 is a vertically-disposed plunger 12 which is cylindrical in form and elongated. At a suitable point between the head of the plunger 12 and its lower extremity a pin 13 passes transversely through the plunger 12 and projects at each end. The length of the pin 13 is more than the diameter of the interior wall of sleeve 4 and is adapted to move up and down with the plunger 12. When the plunger 12 is in its normally raised position, as shown in Figure 1, the ends of the said pin 13 impinge the bottom of collar 9 and limit the upward movement of the plunger 12. Located beneath the cross-pin 13 is an annular washer 14 adapted to move with the plunger 12 and to contain the top of a coil spring 15 which is enclosed in the sleeve 4. The coils of the spring 15 are adapted to pass the threads on the interior wall of the sleeve 4. Interposed between said spring 15 and the plunger 12 is a tubular sleeve 16 which is elongated to extend from collar 9 to the top of collar 7. This sleeve 16 is secured fast in the aperture 11 of collar and in a socket 17 in collar 7. It is provided longitudinally with oppositely disposed slots 18 adapted to receive and guide the pin 13 of the plunger 12 in the up and down movement. It will be understood that the slotted guide 18 merely prevents the cross pin of the plunger from rotating the collars 7 and 9.

The sleeve 4 is free to rotate between said collars 7 and 9, and rotary motion is imparted thereto by the ends of the plunger pin 13 which fit in said thread 8.

In operation, it is merely necessary to grasp the finger grips 10 on collar 9 with the index and ring fingers, and press down on the plunger 12 with the thumb. Movement of the plunger 12 gradually compresses the spring 15 and causes the plunger pin 13 to act on the threads 8 inside of sleeve 4, thus rotating the sleeve 4 and the attached compass point 1. The plunger 12 will return to its original position under the influence of the spring 15. While the rotary movement of the sleeve 4 will be reversed on the up stroke, nevertheless the marking element 1 will continue to describe the circle.

Having thus described my invention what I claim as new and desire to secure by Letters Patent, is:

1. A drafting compass, comprising a rotatable tubular sleeve provided exteriorly with a compass point, upper and lower non-rotating collars positioned in alignment with said sleeve and adapted to contain the sleeve, finger grips projecting from the upper collar, a center mounted in said lower collar, a vertical plunger centered in said upper collar and projecting centrally in said sleeve, and means located within said sleeve and adapted to rotate the sleeve, said means adapted to be operated by the up and down movement of said plunger.

2. A drafting compass, comprising an interiorly-threaded, rotatable tubular sleeve provided exteriorly with an adjustable compass point, upper and lower collars positioned in alignment with said sleeve and connected therewith to permit rotation of said sleeve, finger grips projecting from said upper collar, a center mounted in the lower collar, a coil spring contained within said sleeve and adapted to raise the plunger in said sleeve, a vertical plunger centered in said upper collar and projecting above same and being centered within the sleeve and encircled by said spring, an elongated, tubular sleeve, provided with oppositely-disposed longitudinal slots, secured in said collars and adapted to prevent rotation of same, a transverse pin in said plunger provided with projecting ends engaging said threads, the slotted sleeve being interposed between the plunger and the spring, and a movable washer on said slotted sleeve interposed between the said cross-pin and the top of the coil spring.

BYRON R. CAMERON.

REFERENCES CITED

The following references are of record in the file of this patent:

UNITED STATES PATENTS

| Number | Name | Date |
|---|---|---|
| 951,255 | McMurray | Mar. 8, 1910 |
| 1,005,992 | McMurray | Oct. 17, 1911 |
| 1,201,209 | McMurray | Oct. 10, 1916 |

FOREIGN PATENTS

| Number | Country | Date |
|---|---|---|
| 276,713 | Germany | Sept. 17, 1913 |
| 1,952 | Great Britain, 1910 | Jan. 26, 1910 |